United States Patent
Dawson

(10) Patent No.: US 10,323,776 B2
(45) Date of Patent: Jun. 18, 2019

(54) MARKED CONDUIT OR TUBE

(71) Applicant: Ramon C. Dawson, Long Beach, CA (US)

(72) Inventor: Ramon C. Dawson, Long Beach, CA (US)

(73) Assignee: RMC FUTURES LLC, Long Beach, CA (US)

( * ) Notice: Subject to any disclaimer, the term of this patent is extended or adjusted under 35 U.S.C. 154(b) by 0 days.

(21) Appl. No.: 15/648,356

(22) Filed: Jul. 12, 2017

(65) Prior Publication Data
US 2019/0017632 A1 Jan. 17, 2019

(51) Int. Cl.
F16L 11/00 (2006.01)
F16L 9/00 (2006.01)
B29C 53/08 (2006.01)
B29L 23/00 (2006.01)

(52) U.S. Cl.
CPC ............... *F16L 9/00* (2013.01); *B29C 53/08* (2013.01); *B29L 2023/22* (2013.01); *F16L 9/006* (2013.01)

(58) Field of Classification Search
CPC .................................................... F16L 11/124
USPC ............... 138/104, 36, DIG. 8; D23/266
See application file for complete search history.

(56) References Cited

U.S. PATENT DOCUMENTS

| 928,606 | A | * | 7/1909 | Houghton | |
|---|---|---|---|---|---|
| 4,312,383 | A | * | 1/1982 | Kleykamp | F16L 11/1185 138/103 |
| 5,027,741 | A | * | 7/1991 | Smith | A62B 3/00 116/205 |
| 5,036,210 | A | * | 7/1991 | Goodman | B29C 47/0019 138/104 |
| 5,051,034 | A | * | 9/1991 | Goodman | B29C 47/0019 138/104 |
| 5,122,750 | A | * | 6/1992 | Rippingale | G02B 6/447 324/207.22 |
| 5,182,954 | A | * | 2/1993 | Menheere | E21B 25/06 138/104 |

(Continued)

FOREIGN PATENT DOCUMENTS

EP   1 079 162 A1   2/2001

OTHER PUBLICATIONS

Republic Conduit, Electrunite Electrical Metallic Tubing (EMT), http://republicconduit.com/en/Products/ElectruniteElectrical.aspx.
(Continued)

*Primary Examiner* — Patrick F Brinson
(74) *Attorney, Agent, or Firm* — Foley & Lardner LLP

(57) ABSTRACT

According to various embodiments, there is provided a marked conduit or tube including: a hollow body having an outer surface, a length dimension, and a plurality of markings along the length dimension, the plurality of markings including a first line marking, where the first line marking is positioned at a 0-degree point of a cross-sectional view of the hollow body, a second line marking where the second line marking is positioned at a 90-degree point relative to the 0-degree point of the cross-sectional view of the hollow body, a third line marking, where the third line marking is positioned at a 180-degree point relative to the 0-degree point of the cross-sectional view of the hollow body, and a fourth line marking, where the fourth line marking is positioned at a 270-degree point relative to the 0-degree point of the cross-sectional view of the hollow body.

17 Claims, 9 Drawing Sheets

(56) References Cited

U.S. PATENT DOCUMENTS

| | | | | |
|---|---|---|---|---|
| 5,228,478 | A | * 7/1993 | Kleisle | F16L 57/06 |
| | | | | 116/208 |
| D345,197 | S | * 3/1994 | Potter | D23/266 |
| D445,170 | S | * 7/2001 | Speicher | D23/266 |
| D454,179 | S | * 3/2002 | Speicher | D23/266 |
| D454,386 | S | * 3/2002 | Speicher | D23/266 |
| 8,037,840 | B2 | * 10/2011 | Sutter | G09F 13/16 |
| | | | | 116/200 |
| 9,200,194 | B2 | * 12/2015 | Tomlin | A61M 16/00 |
| 9,588,074 | B2 | * 3/2017 | Demanze | G01M 3/40 |
| 2011/0041943 | A1 | * 2/2011 | Donnelly | F16L 11/124 |
| | | | | 138/137 |
| 2014/0231103 | A1 | 8/2014 | Savage et al. | |
| 2017/0197457 | A1 | 7/2017 | Garr et al. | |

OTHER PUBLICATIONS

International Search Report and Written Opinion dated Sep. 10, 2018, from application No. PCT/US2018/041140.

\* cited by examiner

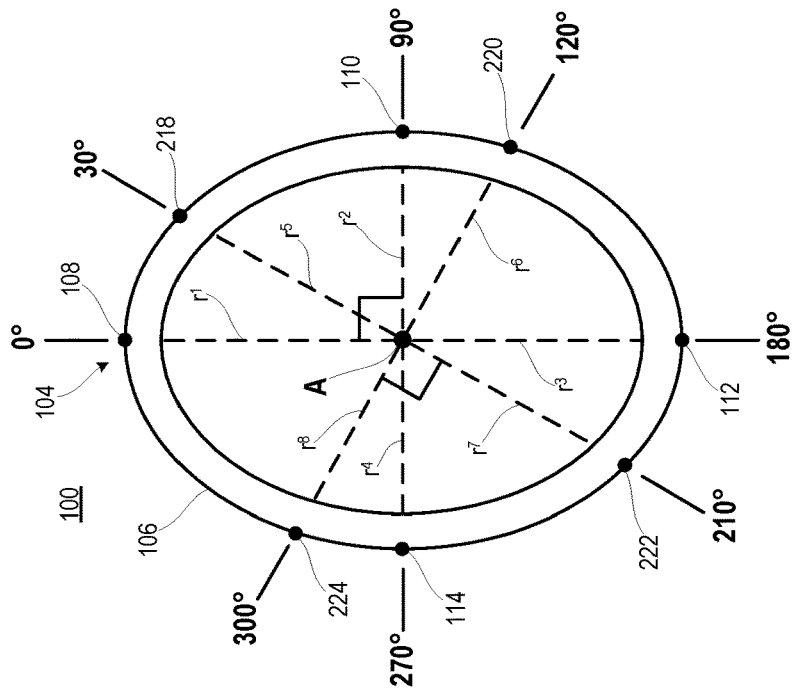
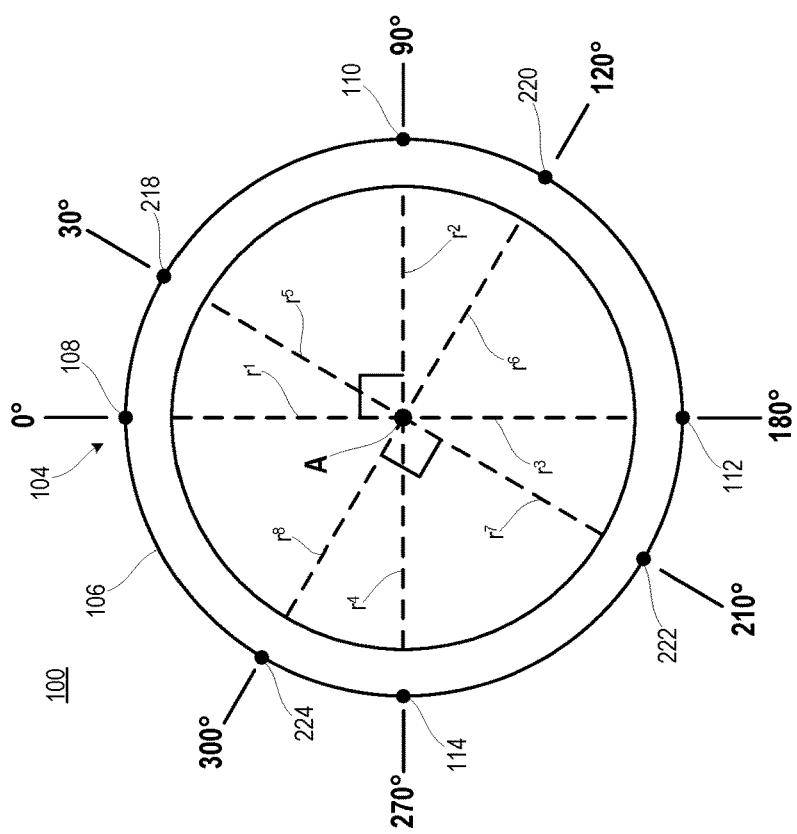

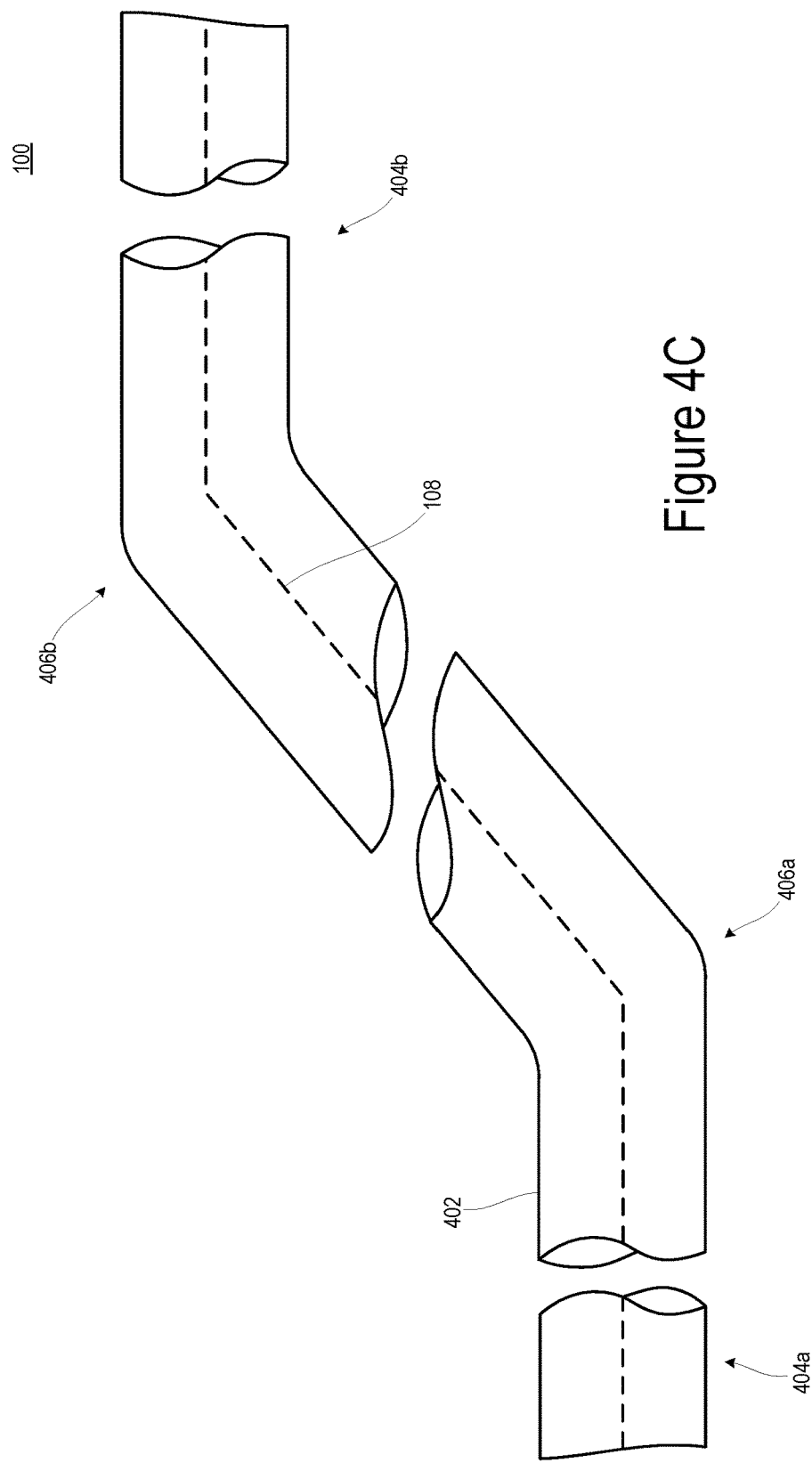

MARKED CONDUIT OR TUBE

BACKGROUND

1. Field

The disclosure relates generally to conduits or tubes and, in particular embodiments, to marked conduits or tubes with a plurality of markings along a length dimension at various intervals to enable proper alignment of the conduits or tubes during bending.

2. Background

Conduits, such as pipes, are commonly used to house wires, fiber optics, and fluids. They are often times bent to fit the shape of the environment, such as within walls or around corners or the structure of the object. Tubes are commonly used as structural elements in objects such as bicycles frames or parasails and are bent to create the structure of the object. Current techniques of bending a conduit or tube include using a hand bender or a hydraulic bender, where the user inserts the conduit or tube into a cylindrical opening and bends the conduit or tube to produce bends of various angles. Other techniques of bending a conduit or tube include bending with the knees or hands and judging the bends by eye. These techniques may frequently result in "dog-legging," which occurs when two or more bends on the conduit or tube are misaligned and are not straight within a plane or on or within walls or ceilings. Misalignment often results in difficulties in installing the conduits or tubes, especially on or within walls or ceilings, and often results in disposal and waste of the misaligned conduit or tube.

SUMMARY

Embodiments of the present disclosure relate to a marked conduit or tube that includes a plurality of markings on the outer surface of a hollow body along the length dimension of the marked conduit or tube to enable proper alignment of the conduit or tube during bending.

According to various embodiments, a marked conduit or tube includes: a hollow body having an outer surface, a length dimension, and a plurality of markings along the length dimension, the plurality of markings including a first line marking, where the first line marking is positioned at a 0-degree point of a cross-sectional view of the hollow body, a second line marking where the second line marking is positioned at a 90-degree point relative to the 0-degree point of the cross-sectional view of the hollow body, a third line marking, where the third line marking is positioned at a 180-degree point relative to the 0-degree point of the cross-sectional view of the hollow body, and a fourth line marking, where the fourth line marking is positioned at a 270-degree point relative to the 0-degree point of the cross-sectional view of the hollow body.

In some embodiments, the hollow body is cylindrical in shape and has a round cross section.

In some embodiments, the hollow body is oval in shape and has an oval cross section.

In some embodiments, the plurality of markings extends along the entire length of the length dimension.

In some embodiments, the plurality of markings extends along a portion of the length dimension.

In some embodiments, the marked conduit or tube includes a hollow interior for use as a structural component or for housing a material, the material comprises at least one of wires, fiber optics, or fluids.

In some embodiments, the hollow body has a diameter of any size up to 12 inches for housing a material, the material includes at least one of wires, fiber optics, or fluids.

In some embodiments, the marked conduit or tube is made of a rigid but bendable material to allow the marked conduit or tube to be bent at various angles.

In some embodiments, the plurality of markings includes one or more additional line markings on the outer surface of the marked conduit or tube, where the additional line markings are parallel to the first, second, third, and fourth line markings.

In some embodiments, the additional line markings are positioned at any 1-degree increments relative to the 0-degree point of the cross-sectional view of the hollow body.

In some embodiments, the first, second, third, and fourth line markings are identical in color and design, and additional line markings are distinguishable from the first, second, third, and fourth line markings by color or design.

In some embodiments, the first, second, third, and fourth line markings are any color such as red, blue, green, or yellow, and the additional line markings are different colors than the first, second, third, and fourth line markings.

In some embodiments, the hollow body is designed so the first, second, third, fourth, and additional line markings are painted, drawn, printed, etched, or ridged onto the outer surface in designs such as solid lines, dotted lines, dashed lines, or double solid lines.

In some embodiments, the length dimension of the hollow body is a length that allows the marked conduit to be bent two or more times.

According to various embodiments, there is provided a method of manufacturing a marked conduit or tube, the method including: providing a hollow body having an outer surface and a length dimension, marking the outer surface of the hollow body with a plurality of markings, the plurality of markings including a first line marking, where the first line marking is positioned at a 0-degree point of a cross-sectional view of the hollow body, a second line marking, where the second line marking is positioned at a 90-degree point relative to the 0-degree point of the cross-sectional view of the hollow body, a third line marking, where the third line marking is positioned at a 180-degree point relative to the 0-degree point of the cross-sectional view of the hollow body, and a fourth line marking, where the fourth line marking is positioned at a 270-degree point relative to the 0-degree point of the cross-sectional view of the hollow body.

In some embodiments, the method further includes marking the outer surface of the hollow body by painting, printing, etching or ridging a plurality of marks on the outer surface.

In some embodiments, the method further includes marking additional line markings at any 1-degree increments relative to the 0-degree point of the cross-sectional view of the hollow body.

In some embodiments, the method further includes marking the additional line markings in a different color than or in a different design than the first, second, third, and fourth line markings, the different designs comprising any combination of solid lines, dotted lines, dashed lines, or double solid lines.

According to various embodiments, there is provided a method of bending a marked conduit or tube, the method including: providing a marked conduit or tube including a hollow body having an outer surface, a length dimension, and a plurality of markings along the length dimension, the plurality of markings including a first line marking, where the first line marking is positioned at a 0-degree point of a cross-sectional view of the hollow body, a second line marking, where the second line marking is positioned at a 90-degree point relative to the 0-degree point of the cross-sectional view of the hollow body, a third line marking, where the third line marking is positioned at a 180-degree point relative to the 0-degree point of the cross-sectional view of the hollow body, and a fourth line marking, where the fourth line marking is positioned at a 270-degree point relative to the 0-degree point of the cross-sectional view of the hollow body, and bending the marked conduit or tube two times, such that only one of the first, second, third, or fourth line markings is visible when a straight portion before a first bend and a straight portion after a second bend are lying flat on a plane, and aligning the marked conduit or tube such that the line markings are equidistant from the edges of the marked conduit or tube lying flat on a plane through the straight portions before and after the bends.

In some embodiments, the method further includes aligning the marked conduit or tube such that the line markings are equidistant from the edges of the marked conduit or tube through the straight portions before the first bend and after the second bend, when the marked conduit or tube is lying flat on a plane.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3C is a cross-sectional view of a cylindrical marked conduit or tube with additional line markings according to various embodiments;

FIG. 3D is a cross-sectional view of an oval-shaped marked conduit or tube with additional line markings according to various embodiments;

FIG. 4C is a top view of a marked conduit or tube with properly aligned bends according to various embodiments;

Figure 1:
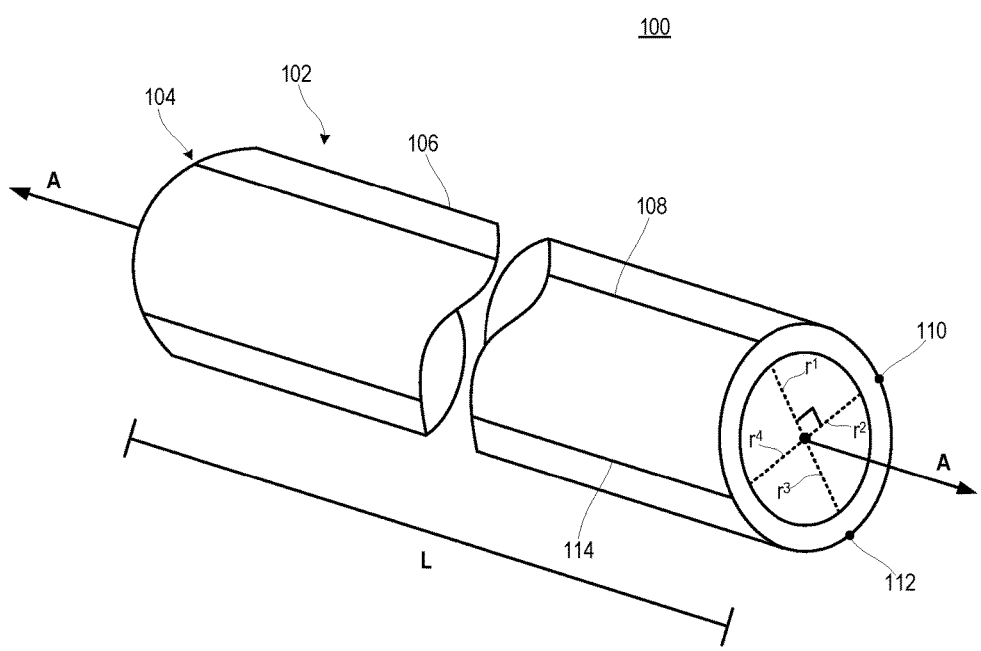
FIG. 1 is a perspective view of a marked conduit or tube according to various embodiments.

The features of embodiments will become more apparent from the detailed description set forth below when taken in conjunction with the drawings, in which like reference characters identify corresponding elements throughout. In the drawings, like reference numbers generally indicate identical, functionally similar, or structurally similar elements.

DETAILED DESCRIPTION

According to various embodiments of the invention, a marked conduit or tube includes a plurality of markings on the outer surface of a hollow body along a length dimension of the marked conduit to enable proper alignment during bending. In the following description, "conduit" and "tube" may be used interchangeably. FIG. 1 is a perspective view of a marked conduit 100 according to various embodiments. In particular embodiments, the marked conduit 100 includes a hollow body 102 having an outer surface 106, a length dimension L, and a plurality of markings 104 parallel to the central axis A and along the length dimension L.

The marked conduit 100 is shown with labels identifying a center axis A and a plurality of radii r1, r2, r3, and r4, each extending from the center axis A to locations at the outer circumference of the hollow body 102 of the marked conduit 100. The center axis A extends along the length dimension L of the hollow body 102, at the center of the circular cross section shape of the hollow body 102. The plurality of markings 104 may include a first line marking 108, a second line marking 110, a third line marking 112, and a fourth line marking 114.

Referring to FIG. 1, the second line marking 110 and the third line marking 114 are shown as dots on the outer surface 106 of the marked conduit 100 where the line markings would be located. Each of the line markings defines a line that extends along the length dimension L of the hollow body 102, parallel to the central axis A. The first line marking 108, second line marking 110, third line marking 112, and fourth line marking 114 are on the outer surface 106 of the marked conduit 100 such that each line marking is located at 90-degree intervals along the outer circumference of the hollow body 102 of the marked conduit 100. For example, when the hollow body 102 is arranged such that the first line marking 108 is at 0 degrees, the second line marking 110 will be at 90 degrees (the 90-degree angle formed by radii r1 and r2), the third line marking 112 will be at 180 degrees (the 90-degree angle formed by radii r2 and r3), and the fourth line marking 114 will be at 270 degrees (the 90-degree angled formed by radii r3 and r4).

Figure 2:
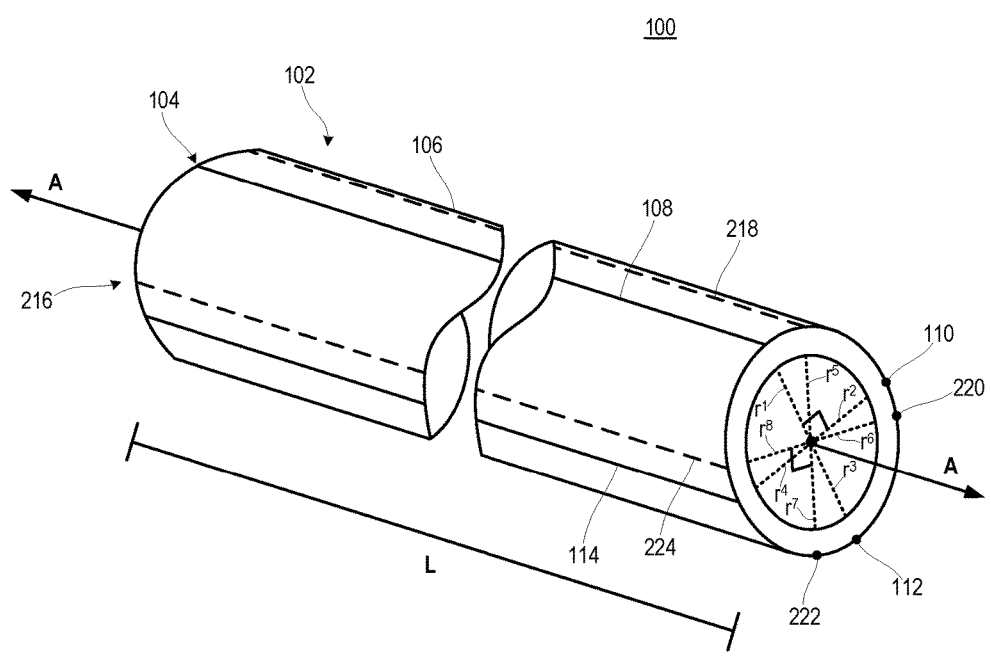
FIG. 2 is a perspective view of a marked conduit or tube with additional line markings according to various embodiments.

FIG. 2 is a perspective view of a marked conduit 100 with additional line markings 216 according to various embodiments of the invention. Features described with respect to the embodiments of FIG. 2 can be employed in other embodiments including, but not limited to, embodiments described with respect to FIG. 1. The same reference numbers as employed in previously described embodiments are used for corresponding features of the embodiments of FIG. 2.

Referring to FIG. 2, in some embodiments, the marked conduit 100 is shown with labels identifying a center axis A and a plurality of radii r1, r2, r3, r4, r5, r6, r7 and r8, extending from the center axis A to locations at the outer circumference of the hollow body 102 of the marked conduit 100. The center axis A extends along the length dimension L of the hollow body 102, at the center of the circular cross section shape of the hollow body 102. The plurality of markings 104 may include a first line marking 108, a second line marking 110, a third line marking 112, a fourth line marking 114, and additional line markings 216 that are parallel to the first 108, second 110, third 112, and fourth line markings 114. In some embodiments, the first line marking 108, second line marking 110, third line marking 112, and fourth line marking 114 are on the outer surface 106 of the marked conduit 100 such that each line marking is located at 90-degree intervals along the outer circumference of the hollow body 102, as described in a previous embodiment. Each of the line markings defines a line that extends along the length dimension L of the hollow body 102, parallel to the central axis A.

In some embodiments, the additional line markings 216 may include line markings in groups of four, which are distinguishable from the first 108, second 110, third 112, and fourth line markings 114 by color or design. For example, one embodiment may include a fifth line marking 218, a sixth line marking 220, a seventh line marking 222, and an eighth line marking 224. The additional line markings 216 may be located on the outer surface 106 such that the additional line markings are located at 90-degree intervals from each other. For example, when the hollow body 102 is arranged such that the fifth line marking 218 is held at 30 degrees, the sixth line marking 220 will be at 120 degrees (the 90-degree angle formed by radii r5 and r6), the seventh line marking 222 will be at 210 degrees (the 90-degree angle formed by radii r6 and r7), and the eight line marking 224 will be at 300 degrees (the 90-degree angled formed by radii r7 and r8).

In some embodiments, the plurality of markings 104 of the marked conduit 100 may include any number of additional line markings 216. The additional line markings 216 may be located at any suitable distance from adjacent markings, such as, but not limited to, 5-degree increments relative to the 0-degree point of the cross-sectional view of the hollow body 102. In other embodiments, the distance between adjacent markings may be 1-degree, 2-degrees, 3-degrees, 10-degrees, etc. The presence of too many additional line markings 216 may make it difficult to follow a single line marking along the length dimension L of the marked conduit 100. Accordingly, in further embodiments, groups of additional line markings 216 may be distinguishable in any of the following ways: color, design, or pattern. Distinguishable additional line markings 216 in accordance with embodiments of the invention are discussed further below.

In some embodiments, additional line markings 216 may include line markings in groups of two or three, with each group being distinguishable from the first 108, second 110, third 112, and fourth 114 line markings by color or design. For example, the first 108, second 110, third 112, and fourth 114 line markings may all be blue while the fifth 218, sixth 220, seventh 222, and eighth 224 line markings may all be red.

In various embodiments, the hollow body 102 of the marked conduit 100 may be cylindrical in shape with a round cross section. In other embodiments, the hollow body 102 of the marked conduit 100 may be oval in shape with an oval cross section. In still further embodiments, the hollow body 102 of the marked conduit 100 may be any suitable shape that allows the marked conduit 100 to be bent at various angles.

In various embodiments, the hollow body 102 of the marked conduit 100 may have a diameter of any suitable size for housing material such as wires, fiber optics, and fluids and also for bending. In other embodiments, the hollow body 102 of the marked tube 100 may have a diameter of any suitable size for serving as a structural element for objects such as bicycle frames or parasails. In some embodiments, the diameter of the hollow body 102 may be any size up to 12 inches, such as ½ inch, ¾ inch, 1 inch, 1¼ inches, 1½ inches, 2 inches, 2½ inches, 3 inches, or 4 inches. In other embodiments, the diameter of the hollow body 102 may be any size up to 24 inches.

In some embodiments, the marked conduit 100 may include a hollow body 102 with a length dimension L of any suitable length to allow for bending of the marked conduit 100. In one embodiment, the marked conduit 100 may have a length dimension L suitable for bending the marked conduit 100 two times. In other embodiments, the marked conduit 100 may have a length dimension L suitable for bending the marked conduit 100 more than two times.

In some embodiments, the marked conduit 100 may be made from any suitable rigid, but bendable, material, such as, but not limited to, cast iron, brass, steel, plastic, polyvinyl chloride (PVC), chlorinated polyvinyl chloride (CPVC), PEX (cross-linked polyethylene), nylon, galvanized steel, electrical metallic tubing (EMT), rigid metal conduit, and/or the like. In other embodiments, the marked conduit 100 may be made from any suitable rigid, but bendable, material for housing material such as wires, fiber optics, and fluids. In further embodiments, the marked tube 100 may be made from any suitable rigid, but bendable, material for use as structural elements.

FIGS. 3A-3D are cross-sectional views of marked conduits 100 showing the locations of the plurality of markings 104 according to various embodiments of the invention. The locations of line markings are shown with dots on the edges of the marked conduits 100. Features described with respect to embodiments of FIGS. 3A-3D can be employed in other embodiments including, but not limited to, embodiments described with respect to FIGS. 1-2. The same reference numbers as employed in previously described embodiments are used for corresponding features of the embodiments of FIGS. 3A-3D.

Figure 3B:
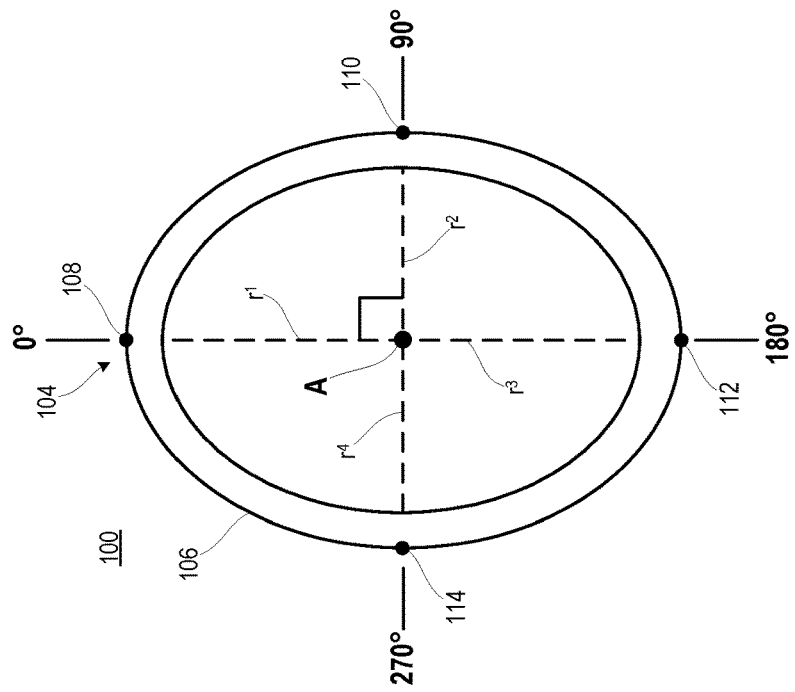
FIG. 3B is a cross-sectional view of an oval-shaped marked conduit or tube according to various embodiments.
Figure 3A:
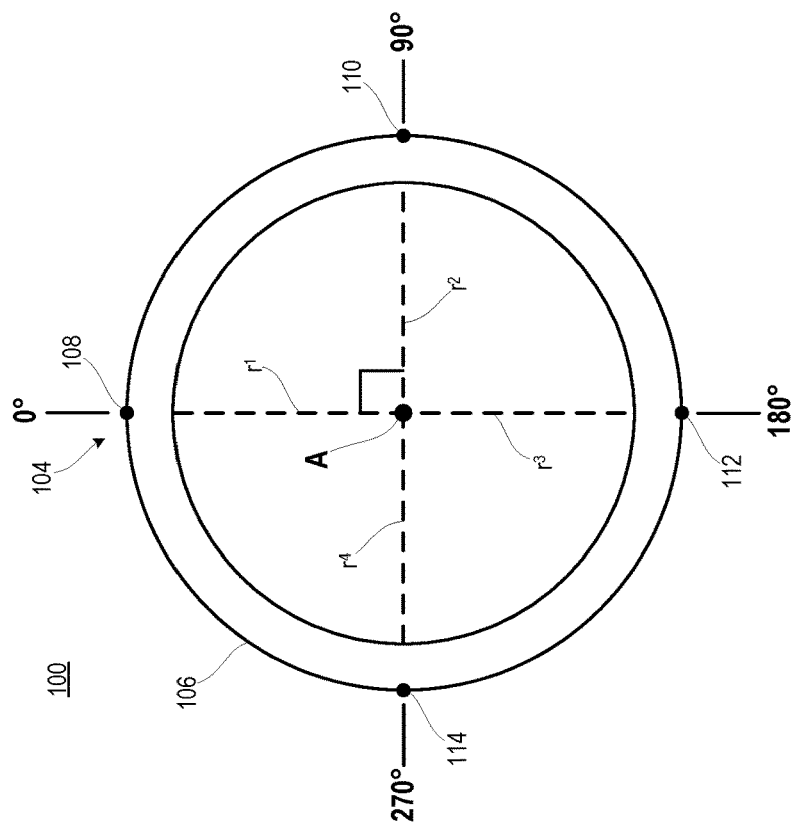
FIG. 3A is a cross-sectional view of a cylindrical marked conduit or tube according to various embodiments.

Referring to FIGS. 3A and 3B, the marked conduit 100 is shown with labels identifying a center axis A and a plurality of radii r1, r2, r3, and r4, each extending from the center axis A to locations at the outer circumference of the hollow body 102 of the marked conduit 100. The outer surface 106 of the hollow body 102 may include the first line marking 108, second line marking 110, third line marking 112, and fourth line marking 114 spaced at 90-degree intervals along the outer circumference of the hollow body 102. For example, when the cross-section is arranged such that the first line marking 108 is held at 0 degrees, the second line marking 110 will be at 90 degrees (the 90-degree angle formed by radii r1 and r2), the third line marking 112 will be at 180 degrees (the 90-degree angle formed by radii r2 and r3), and the fourth line marking 114 will be at 270 degrees (the 90-degree angle formed by radii r3 and r4).

Referring to FIGS. 3C and 3D, the marked conduit 100 is shown with labels identifying a center axis A and a plurality of radii r1, r2, r3, r4, r5, r6, r7 and r8, each extending from the center axis A to locations at the outer circumference of the hollow body 102 of the marked conduit 100. The outer surface 106 of the hollow body 102 may include the first line marking 108, second line marking 110, third line marking 112, and fourth line marking 114 spaced at 90-degree intervals along the outer circumference of the hollow body 102, as shown in previously described embodiments.

In some embodiments, the outer surface 106 may also include additional line markings 216. The additional line markings 216 may include a fifth line marking 218, a sixth line marking 220, a seventh line marking 222, and an eighth line marking 224, each at 90-degree intervals from each other. For example, when the cross-section is arranged such that the fifth line marking 218 is held at 30 degrees, the sixth line marking 220 will be at 120 degrees (the 90-degree angle formed by radii r5 and r6), the seventh line marking 222 will be at 210 degrees (the 90-degree angle formed by radii r6 and r7), and the eight line marking 224 will be at 300 degrees (the 90-degree angle formed by radii r7 and r8).

In further embodiments, the plurality of markings 104 of the marked conduit 100 may include any number of additional line markings 216. The additional line markings 216 may be located at any suitable distance from adjacent markings, such as, but not limited to, 5-degree increments relative to the 0-degree point of the cross-sectional view of the hollow body 102. In other embodiments, the distance between adjacent markings may be 1-degree, 2-degrees, 3-degrees, 10-degrees, etc. In other embodiments, additional line markings 216 may include line markings in groups of two, three, or four, with each group being distinguishable from the first 108, second 110, third 112, and fourth 114 line markings by color or design. For example, the first 108, second 110, third 112, and fourth 114 line markings may all be blue while the fifth 218, sixth 220, seventh 222, and eighth 224 line markings may all be red. Distinguishable additional line markings 216 in accordance with embodiments of the invention are discussed further below.

Figure 4A:
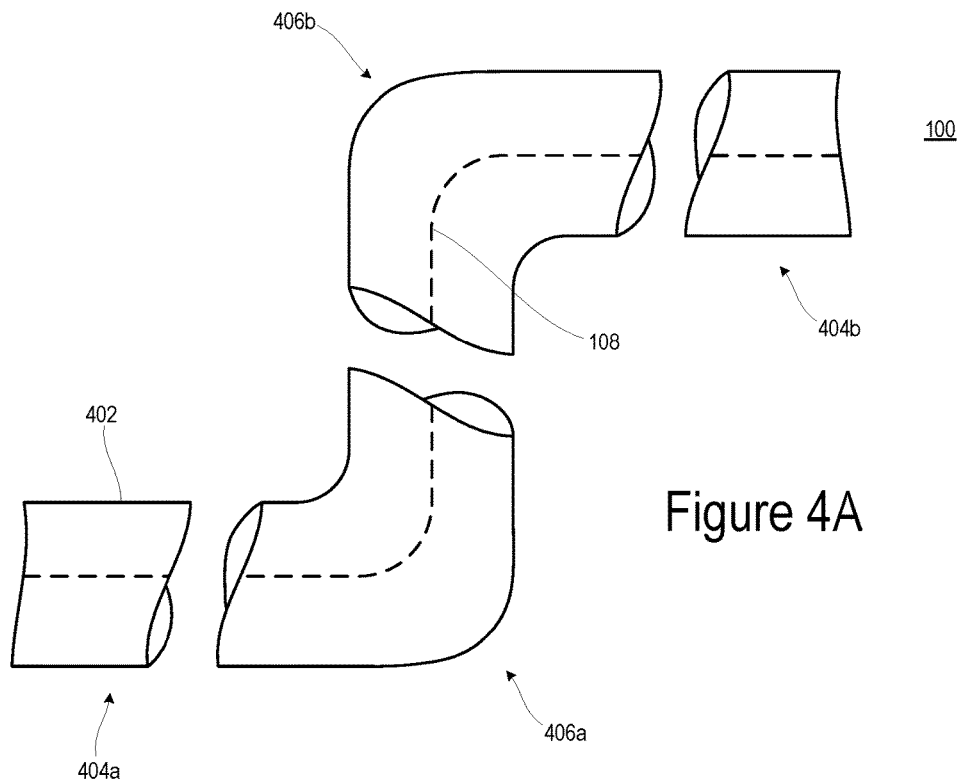
FIG. 4A is a top view of a marked conduit or tube with properly aligned bends according to various embodiments.
Figure 4B:
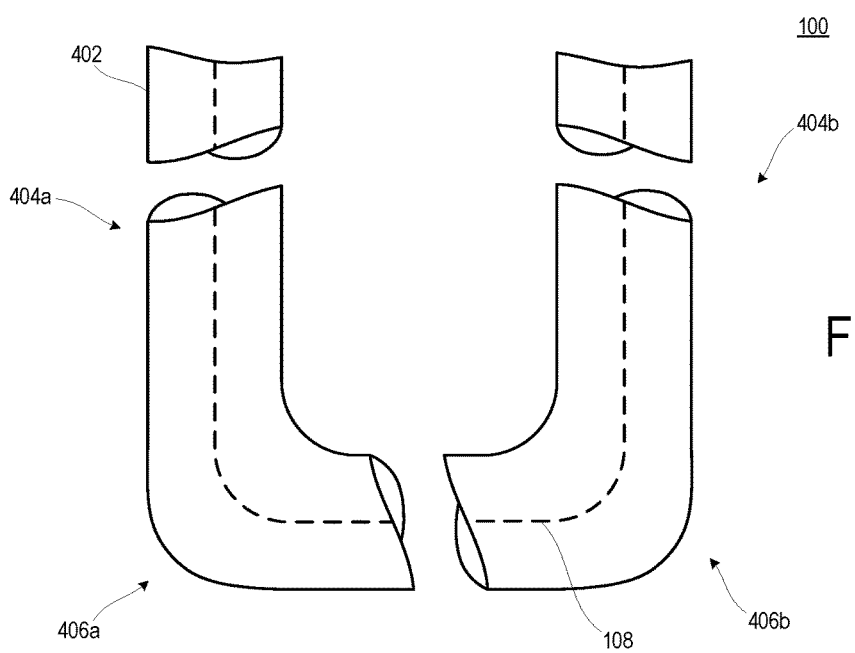
FIG. 4B is a top view of a marked conduit or tube with properly aligned bends according to various embodiments.
Figure 4D:
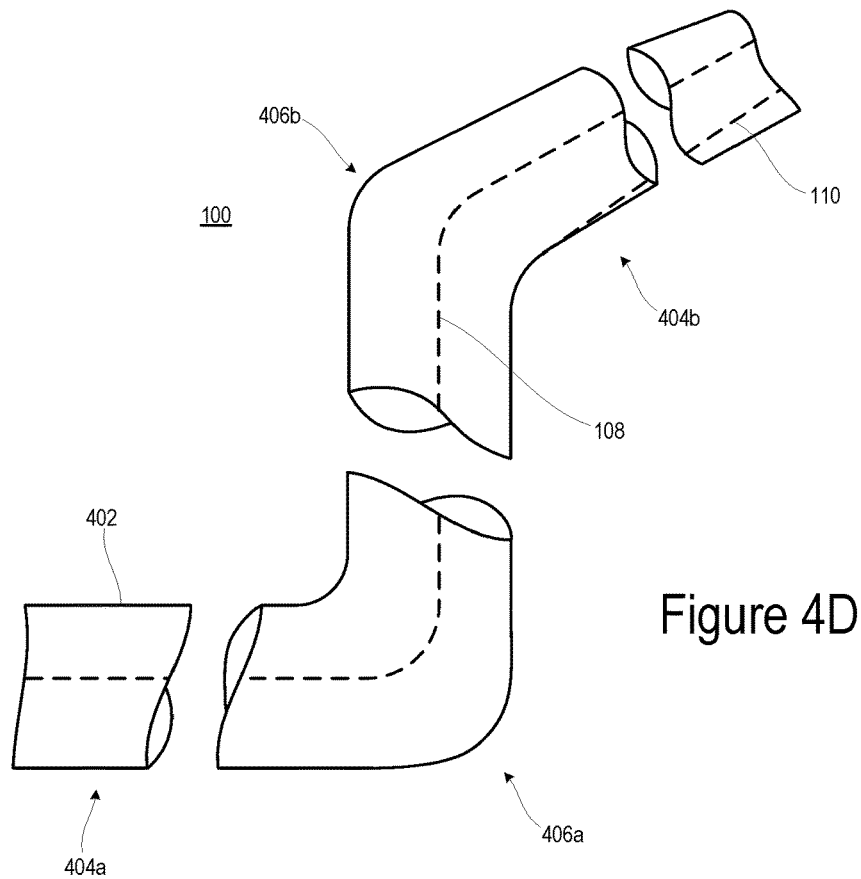
FIG. 4D is a top view of a marked conduit or tube with a "dog leg" according to various embodiments.
Figure 4E:
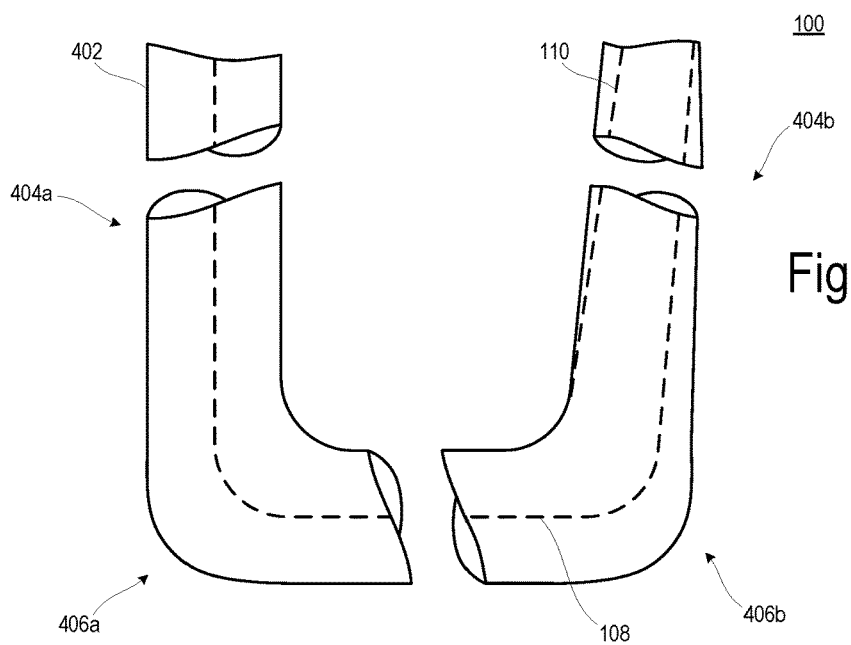
FIG. 4E is a top view of a marked conduit or tube with a "dog leg" according to various embodiments.
Figure 4F:
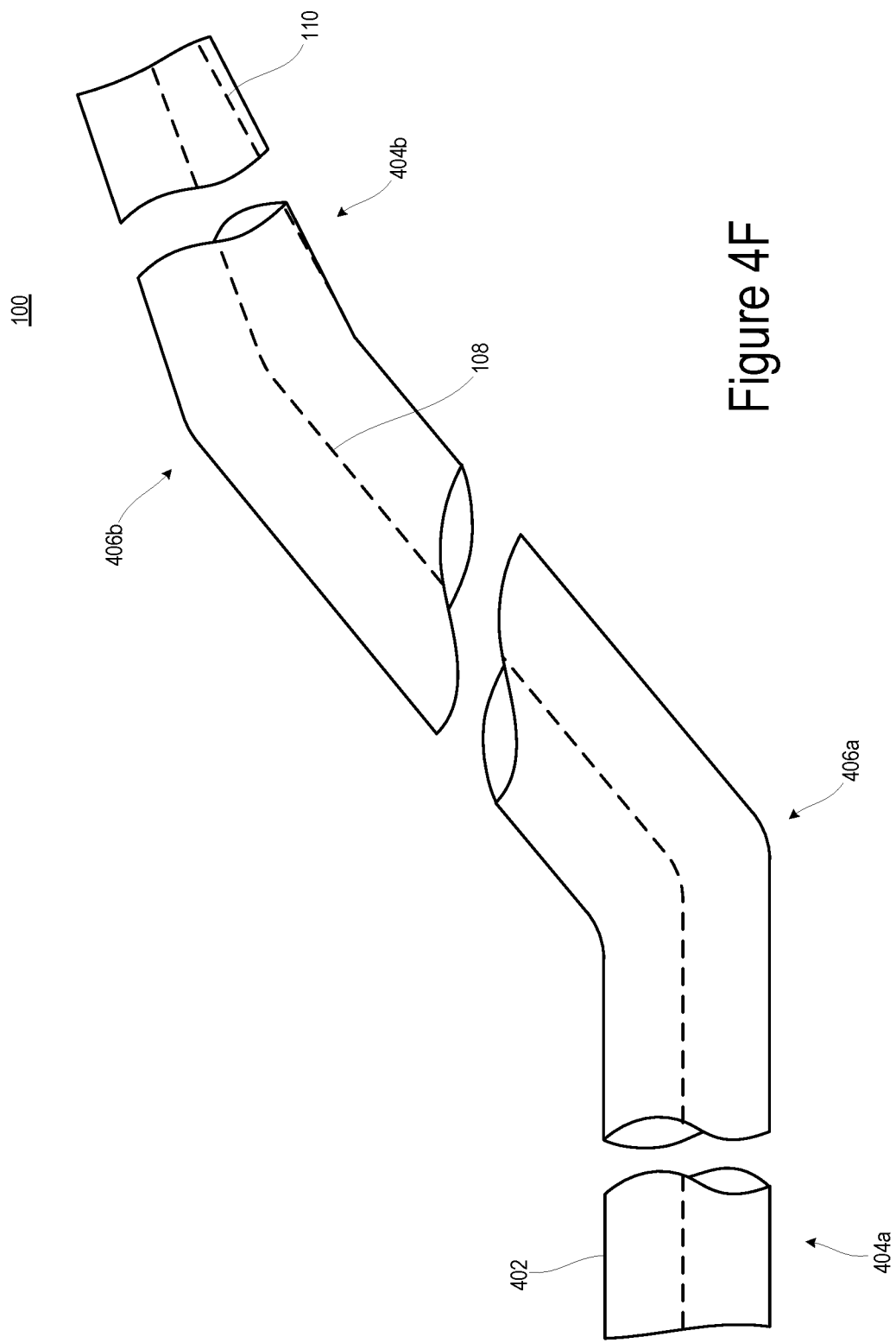
FIG. 4F is a top view of a marked conduit or tube with a "dog leg" according to various embodiments.

FIGS. 4A-4F are top views of a marked conduit 100 that has two bends in the same plane. FIGS. 4A-4C are top views of a marked conduit 100 with a properly aligned first bend 406a and second bend 406b. FIGS. 4D-4F are top views of a marked conduit 100 with an improperly aligned first bend 406a and second bend 406b, resulting in a "dog leg." Features described with respect to the embodiments of FIGS. 4A-4F can be employed in other embodiments including, but not limited to, embodiments described with respect to FIGS. 1-3D. The same reference numbers as employed in previously described embodiments are used for corresponding features of the embodiments of FIGS. 4A-4F.

Referring to FIGS. 4A-4C, in some embodiments, the marked conduit 100 may have a first bend 406a with a straight portion of the hollow body before the first bend 404a and a second bend 406b with a straight portion of the hollow body after the second bend 404b. In other embodiments, the marked conduit 100 may also have a first line marking 108. The first line marking 108 may extend along the entire length dimension L of the marked conduit 100 or may only extend along a portion of the length dimension L.

When the marked conduit 100 has a properly aligned first bend 406a and second bend 406b in the same plane, the first line marking 108 will be visible from a top view at a location equidistant from the edge 402 of the marked conduit 100 from the straight portion of the hollow body before the first bend 404a, through the first 406a and second 406b bends and to the straight portion of the hollow body after the second bend 404b. For example, for the marked conduit 100 with a properly aligned first bend 406a and second bend 406b in the same plane, the first line marking 108 will remain centered in a single plane along its length (e.g., the plane of the sheet of the drawings of FIGS. 4A-C), from the straight portion of the hollow body before the first bend 404a, through the first bend 406a and second bend 406b, and to the straight portion of the hollow body after the second bend 404b.

In other words, referring to FIGS. 4A and 4C where the first bend 406a and the second bend 406b are properly aligned in the same plane, when the marked conduit 100 is positioned in front of the user such that the straight portion before the first bend 404a, and the straight portion after the second bend 404b are extending outwards directly in front of the user, the first line marking 108 will remain in a straight line through both bends on the marked conduit 100.

In other embodiments, the marked conduit 100 may have properly aligned bends that are not in the same plane. For example, the marked conduit 100 may be bent such that the straight portion before the first bend 406a and the straight portion after the second bend 406b are extending into planes that are perpendicular to each other. When the marked conduit 100 has a first bend 406a and a second bend 406b such that the straight portion before the first bend 404a and the straight portion after the second bend 404b are extending into perpendicular planes, the user may use the line markings as visual guides to create 90-degree bends. The user may also rotate the marked conduit 100 to view the bends from different perspectives and may use the line markings as visual guides from different perspectives to ensure that the bends are at 90-degree angles.

Referring to FIGS. 4D-4F, in other embodiments, the marked conduit 100 may have a first bend 406a with a straight portion of the hollow body before the first bend 404a and a second bend 406b with a straight portion of the hollow body after the second bend 404b. In some embodiments, the marked conduit 100 may also have a first line marking 108 and a second line marking 110. The first line marking 108 and the second line marking 110 may extend along the entire length dimension L of the marked conduit 100 or may only extend along a portion of the length dimension L.

When the marked conduit 100 has an improperly aligned first bend 406a and second bend 406b, the first line marking 108 will not remain centered and equidistant from the edge 402 of the marked conduit 100 from the straight portion of the hollow body before the first bend 404a, through the first 406a and second 406b bends, and to the straight portion of the hollow body after the second bend 404b. For example, for the marked conduit 100 with an improperly aligned first bend 406a and second bend 406b, the first line marking 108 will not remain centered and will not remain in a single plane (e.g., the plane of the sheet of the drawings of FIGS. 4D-F), from the straight portion of the hollow body before the first bend 404a, through the first 406a and second 406b bends, and to the straight portion of the hollow body after the second bend 404b. In addition, the second line marking 110 may become visible. In other words, when the marked conduit 100 has a "dog leg," the first line marking 108 will not remain centered through the first bend 406a and second bend 406b.

In other words, referring to FIGS. 4D and 4F where the first bend 406a and second bend 406b are improperly aligned, when the marked conduit 100 is positioned in front of the user such that the straight portion before the first bend 404a is extending outwards directly in front of the user, the first line marking 108 will remain in a straight line from the straight portion before the first bend 404a to the second bend 406b, but will angle to the side through the straight portion after the second bend 404b.

In other embodiments, the marked conduit 100 may have improperly aligned bends that are not in the same plane. For example, the marked conduit 100 may be bent such that the straight portion before the first bend 406a and the straight portion after the second bend 406b are extending into planes that are perpendicular to each other. When the marked conduit 100 has a first bend 406a and a second bend 406b such that the straight portion before the first bend 404a and the straight portion after the second bend 404b are extending into perpendicular planes, the user may use the line markings as visual guides to create 90-degree bends that are properly aligned. When the 90-degree bends are improperly aligned, the line markings will not form 90-degree angles. The user may also rotate the marked conduit 100 to view the bends from different perspectives and may use the line markings as visual guides from different perspectives to ensure that the bends are at 90-degree angles.

Referring to FIGS. 4A-4F, in various embodiments, the marked conduit 100 may include pre-formed bends or may be straight (without bends). A user may use the plurality of line markings as a visual guide when bending or unbending (or further bending or unbending) the marked conduit 100, so that the straight portion before the first bend 404a and the straight portion after the second bend 404b are properly aligned. In other embodiments, the marked conduit 100 may have any number of bends greater than two.

FIGS. 5A-5F are side views of a marked conduit 100 with line markings of various designs according to various embodiments of the invention. The plurality of line markings 502 may be made by any suitable marking mechanism. Referring to FIGS. 5A-5D, in some embodiments, the plurality of line markings 502 may be printed, drawn, or painted along the length dimension L. The design of the plurality of line markings 502 may be a solid line 504, a dashed line 506, a diagonal dashed line 508, a dotted line 510 or any other design suitable for forming a line marking, such as a double solid line. In other embodiments, the plurality of line markings may be a combination of different designs.

Figure 5A:
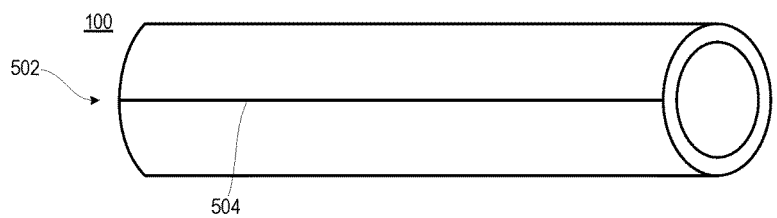
FIG. 5A is a side view of a marked conduit or tube with a plurality of markings printed on the marked conduit or tube in the design of a solid line according to various embodiments.
Figure 5B:
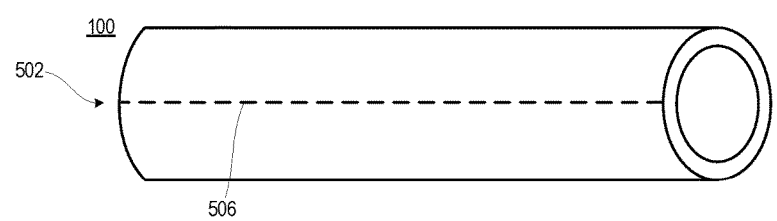
FIG. 5B is a side view of a marked conduit or tube with a plurality of markings printed on the marked conduit or tube in the design of a dashed line according to various embodiments.
Figure 5C:
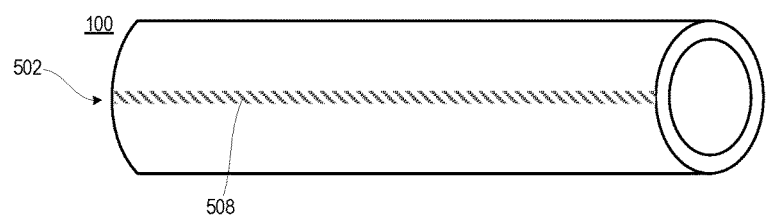
FIG. 5C is a side view of a marked conduit or tube with a plurality of markings printed on the marked conduit or tube in the design of a diagonally dashed line according to various embodiments.
Figure 5D:
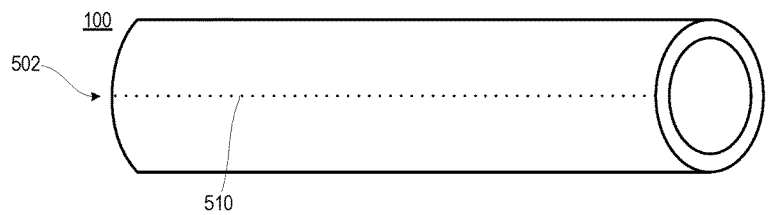
FIG. 5D is a side view of a marked conduit or tube with a plurality of markings printed on the marked conduit or tube in the design of a dotted line according to various embodiments.
Figure 5E:
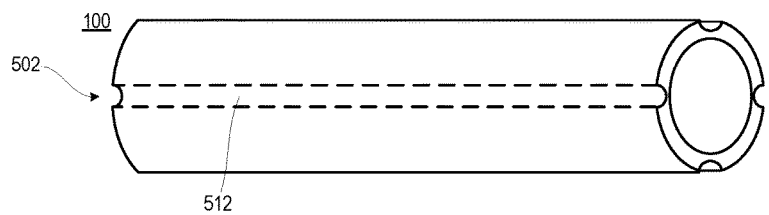
FIG. 5E is a side view of a marked conduit or tube with a plurality of markings etched into the marked conduit or tube according to various embodiments.

Referring to FIG. 5E, in one embodiment, the plurality of line markings 502 may be etched along the length dimension L. The design of the etched line marking 512 may be a solid line, a dashed line, a diagonal dashed line, a dotted line, or any other design suitable for forming a line marking such as a double solid line. The plurality of line markings 502 may also be a combination of different etched designs. The marks may be lightly etched so as not to alter the structural integrity of the marked conduit 100, but discernable enough to see the etched marks upon closer examination when bending the marked conduit 100.

Figure 5F:
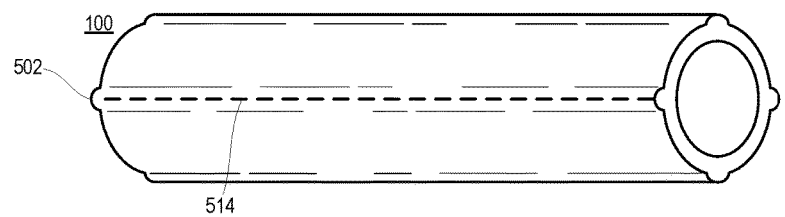
FIG. 5F is a side view of a marked conduit or tube with a plurality of markings ridged onto the marked conduit or tube according to various embodiments.

Referring to FIG. 5F, in another embodiment, the plurality of line markings 502 may be ridged along the length dimension L. The design of the ridged line markings 514 may be a solid line, a dashed line, a diagonal dashed line, a dotted line, or any other design suitable for forming a ridged line marking such as a double solid line. The plurality of line markings 502 may also be a combination of different ridged designs.

In particular embodiments, the plurality of line markings 502 may extend along the entire length of the length dimension L. In other embodiments, the plurality of line markings 502 may extend along only a portion of the length dimension L. In still further embodiments, the plurality of line markings 502 may be located at repeating intervals along portions of the length dimension L.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, and their equivalents, rather than the embodiments. Various modifications and changes that come within the meaning and range of equivalency of the claims are intended to be within the scope of the invention.

What is claimed is:

1. A marked conduit or tube comprising:
 a hollow body having an outer surface, a length dimension, and a plurality of markings along the length dimension, the plurality of markings comprising:
  a first line marking, wherein the first line marking is positioned at a 0-degree point of a cross-sectional view of the hollow body;
  a second line marking, wherein the second line marking is positioned at a 90-degree point relative to the 0-degree point of the cross-sectional view of the hollow body;
  a third line marking, wherein the third line marking is positioned at a 180-degree point relative to the 0-degree point of the cross-sectional view of the hollow body; and
  a fourth line marking, wherein the fourth line marking is positioned at a 270-degree point relative to the 0-degree point of the cross-sectional view of the hollow body;
 wherein the outer surface of the hollow body is devoid of further line markings that extend along the entire length dimension of the hollow body; and
 wherein the marked conduit or tube is made of a rigid but bendable material to allow the marked conduit or tube to be bent during use at various angles and remain rigid after being bent.

2. The marked conduit or tube of claim 1 wherein the hollow body is cylindrical in shape and comprises a round cross section.

3. The marked conduit or tube of claim 1 wherein the hollow body is oval in shape and comprises an oval cross section.

4. The marked conduit or tube of claim 1 wherein the plurality of markings extends along the entire length of the length dimension.

5. The marked conduit or tube of claim 1 wherein the hollow body is made of a material that allows the hollow body to be bent to form a first bend and a second bend along a portion of the length dimension such that only one of the first, second, third, or fourth line markings is visible on top of the hollow body when a straight portion before a first bend and a straight portion after a second bend are lying flat on a plane.

6. The marked conduit or tube of claim 1 wherein the marked conduit or tube comprises a hollow interior for use as a structural component or for housing a material, the material comprises at least one of wires, fiber optics, or fluids.

7. The marked conduit or tube of claim 1 wherein the hollow body has a diameter of any size up to 12 inches for housing a material, the material comprises at least one of wires, fiber optics, or fluids.

8. The marked conduit or tube of claim 1 wherein the first, second, third, and fourth line markings are identical in color and design.

9. The marked conduit or tube of claim 1 wherein the first, second, third, and fourth line markings are red, blue, green, or yellow.

10. The marked conduit or tube of claim 1 wherein the hollow body is designed so the first, second, third, and fourth line markings are painted, drawn, printed, etched, or ridged onto the outer surface in designs as solid lines, dotted lines, dashed lines, or double solid lines.

11. The marked conduit or tube of claim 1 wherein the length dimension of the hollow body is a length that allows the marked conduit or tube to be bent two or more times along the length dimension.

12. A method of manufacturing a marked conduit or tube, the method comprising:
 providing a hollow body having an outer surface and a length dimension;
 marking the outer surface of the hollow body with a plurality of markings, the plurality of markings comprising:
  a first line marking, wherein the first line marking is positioned at a 0-degree point of a cross-sectional view of the hollow body;
  a second line marking, wherein the second line marking is positioned at a 90-degree point relative to the 0-degree point of the cross-sectional view of the hollow body;
  a third line marking, wherein the third line marking is positioned at a 180-degree point relative to the 0-degree point of the cross-sectional view of the hollow body; and
  a fourth line marking, wherein the fourth line marking is positioned at a 270-degree point relative to the 0-degree point of the cross-sectional view of the hollow body;
 wherein the outer surface of the hollow body is devoid of further line markings that extend along the entire length dimension of the hollow body; and
 wherein providing a hollow body comprises providing a hollow body made of a rigid but bendable material comprising at least one of cast iron, brass, steel, galvanized steel, electrical metallic tubing (EMT), or rigid metal conduit, allowing the marked conduit or tube to be bent during use at various angles and remain rigid after being bent.

13. The method of claim 12, wherein marking the outer surface of the hollow body is done by painting, printing, etching or ridging a plurality of marks on the outer surface.

14. A method of bending a marked conduit or tube, the method comprising:
 providing a marked conduit or tube comprising a hollow body having an outer surface, a length dimension, and a plurality of markings along the length dimension, the plurality of markings comprising:
  a first line marking, wherein the first line marking is positioned at a 0-degree point of a cross-sectional view of the hollow body;
  a second line marking, wherein the second line marking is positioned at a 90-degree point relative to the 0-degree point of the cross-sectional view of the hollow body;
  a third line marking, wherein the third line marking is positioned at a 180-degree point relative to the 0-degree point of the cross-sectional view of the hollow body; and
  a fourth line marking, wherein the fourth line marking is positioned at a 270-degree point relative to the 0-degree point of the cross-sectional view of the hollow body; and
 bending the marked conduit or tube two times such that only one of the first, second, third, or fourth line markings is visible when a straight portion before a first bend and a straight portion after a second bend are lying flat on a plane;
 wherein the marked conduit or tube is made of a rigid but bendable material to allow the marked conduit or tube to be bent during use at various angles and remain rigid after being bent.

15. The method of claim 14, further comprising aligning the marked conduit or tube such that the line markings are equidistant from the edges of the marked conduit lying flat on a plane through the straight portions before the first bend and after the second bend.

16. The marked conduit of claim 1 wherein the rigid but bendable material comprises at least one of cast iron, brass, steel, plastic, polyvinyl chloride (PVC), chlorinated polyvinyl chloride (CPVC), PEX (cross-linked polyethylene), nylon, galvanized steel, electrical metallic tubing (EMT), or rigid metal conduit.

17. The method of claim 12, wherein providing the hollow body comprises providing a hollow tube structure made of a material that allows the hollow tube structure to be bent to form a first bend and a second bend such that only one of the first, second, third, or fourth line markings is visible on top of the hollow body when a straight portion before a first bend and a straight portion after a second bend are lying flat on a plane.

* * * * *